United States Patent
Liu

(10) Patent No.: US 7,356,091 B2
(45) Date of Patent: Apr. 8, 2008

(54) APPARATUS, METHODS AND ARTICLES OF MANUFACTURE FOR SIGNAL PROPAGATION USING UNWRAPPED PHASE

(75) Inventor: Frank Liu, Princeton, NJ (US)

(73) Assignee: M/A-COM, Inc., Lowell, MA (US)

( * ) Notice: Subject to any disclaimer, the term of this patent is extended or adjusted under 35 U.S.C. 154(b) by 762 days.

(21) Appl. No.: 10/731,354

(22) Filed: Dec. 9, 2003

(65) Prior Publication Data

US 2005/0123063 A1 Jun. 9, 2005

(51) Int. Cl.
*H04L 27/04* (2006.01)
(52) U.S. Cl. .................................. 375/295; 455/91
(58) Field of Classification Search ............ 375/295, 375/297, 296
See application file for complete search history.

(56) References Cited

U.S. PATENT DOCUMENTS

| 5,757,858 | A | 5/1998 | Black et al. ............... 375/295 |
| 5,952,895 | A | 9/1999 | McCune, Jr. et al. ....... 332/128 |
| 6,094,101 | A | 7/2000 | Sander et al. ............... 331/17 |
| 6,140,882 | A | 10/2000 | Sander ....................... 331/25 |
| 6,255,912 | B1 | 7/2001 | Laub et al. .................. 331/25 |
| 6,411,655 | B1 | 6/2002 | Holden et al. .............. 375/269 |
| 6,975,687 | B2 * | 12/2005 | Jackson et al. ............. 375/297 |
| 2002/0067773 | A1 | 6/2002 | Jackson et al. ............. 375/308 |
| 2003/0031267 | A1 | 2/2003 | Hietala ....................... 375/295 |

FOREIGN PATENT DOCUMENTS

EP 0 940 958 A1 9/1999

OTHER PUBLICATIONS

Marvin A. Schofield et al, "Fast Phase unwrapping algorithm for interferometric applications", Optics Letters / vol. 28, No. 14 / Jul. 15, 2003.*

* cited by examiner

*Primary Examiner*—David C. Payne
*Assistant Examiner*—Leon Flores

(57) ABSTRACT

The invention relates to a system for processing an electromagnetic input signal in which processing circuitry may be used to produce a bounded phase signal, such as by calculating an n-bit 2's compliment number in the range of [−1, 1] from phase sample information for an input wave; and producing an unwrapped phase difference signal from the bound phase signal, such as by taking a 2's compliment subtraction using another wrapped phase signal from previous phase sample information. A corrected phase signal may also be used by taking a 2's complement addition using the bounded phase signal, wherein the unwrapped phase difference signal is produced using the corrected phase signal.

31 Claims, 10 Drawing Sheets

APPARATUS, METHODS AND ARTICLES OF MANUFACTURE FOR SIGNAL PROPAGATION USING UNWRAPPED PHASE

FIELD OF THE INVENTION

The invention relates generally to the processing of electromagnetic waves, and more particularly, the invention relates to signal modulation using an unwrapped phase signal.

BACKGROUND OF THE INVENTION

Electromagnetic waves may be transferred from place to place through a conductor. In wired transmission, the conductor is usually a wire or other solid substance. In wireless transmission, the conductor is usually an ambient substance, such as air, water, etc. In wireless connections a transmitter is usually used to transfer a wave and a receiver to receive a wave. A transceiver combines the functions of both transmitter and receiver in one system. A transmitter typically converts electrical energy into a signal, which is then broadcast via an antenna to a receiver's antenna. Repeaters, middle stations, etc. may be used as intermediates in the transmission to sustain the integrity of the transmitted wave.

The electrical energy input into a transmitter usually is modulated into a basic transmission or carrier signal by overlaying some intelligence upon the energy—speech, data, etc.—in the form of an information signal, and the receiver typically demodulates the modulated carrier signal, once received, into a copy of the initial intelligence sent by the transmitter.

In order to accomplish their function, transmitters and receivers are comprised of various building block components. An electromagnetic information signal (which may be generated from the intelligence in any number of ways, e.g., by one or more transducers, such as a microphone, or received from a modulator, such as an analog modem) to be propagated may be modulated onto a carrier wave using a mixer, or modulator. The carrier wave itself is usually generated by an oscillator. An amplifier is usually used at one or more places in the transmitter circuitry to boost the signal strength, to provide power to active components, etc. Similarly, one or more filters are usually used as well, to clean up the input wave, the outputted signal, etc. An antenna is used to broadcast the signal, and a power supply will supply power as needed.

Various techniques may be used to actually transfer the intelligence. For example, electromagnetic waves representing the information signal in wireless transmission may be modulated into carrier waves by varying wave characteristics such as amplitude, frequency and phase, in an analog or digital manner.

One such mechanism for modulating an input signal is a digital phase modulator, in which a portion of the input signal, such as its phase information, may be digitized and used to modulate the phase of a carrier wave. In a digital phase modulator, a phase signal in the range of $[-\pi,\pi]$ is called a wrapped phase, $\Phi_{wrap}(t)$. One characteristic of a wrapped phase is that it may have $2\pi$ discontinuities in phase that results large phase difference when used to modulate the carrier wave. However, the phase modulator requires smooth phase difference signal as its input.

For a digital phase modulator, an unwrapped phase signal gives a smooth waveform without the aforementioned $2\pi$ jumps in phase and results a better spectrum than a wrapped phase signal. However, an unwrapped phase signal is, in most cases, not bounded, and thus requires more bits to represents the unwrapped phase signal in a fixed-point implementation. Consequently, the unwrapped phase computation requires a larger die size and consumes more power.

It would be desirable to provide more efficient and precise transmitter, receiver and transceiver systems, methods and articles of manufacture, and particularly to provide a modulation system that uses a smaller die size and consumes less power, while improving accuracy and efficiency.

SUMMARY OF THE INVENTION

The invention comprises systems, methods and articles of manufacture for transmitting and receiving electromagnetic waves and signals. Embodiments of the invention may include a system for processing an electromagnetic input signal in which processing circuitry may be used to produce a bounded phase signal, such as by calculating an n-bit 2's compliment number in the range of $[-1, 1]$ from phase sample information for an input wave; and producing an unwrapped phase difference signal from the bound phase signal, such as by taking a 2's compliment subtraction using another wrapped phase signal from previous phase sample information. A corrected phase signal may also be used by taking a 2's complement addition using the bounded phase signal, wherein the unwrapped phase difference signal is produced using the corrected phase signal. This phase processing system may be incorporated, for example, in a transmitter using phase modulation and a segmented amplifier to modulated and transmit an input signal.

BRIEF DESCRIPTION OF THE DRAWINGS

For the purpose of illustrating the invention, there is shown in the drawings at least one embodiment, which is presently preferred; it being understood, however, that this invention is not limited to the precise arrangements, methods and instrumentalities shown.

DETAILED DESCRIPTION OF THE INVENTION

Figure 1A:
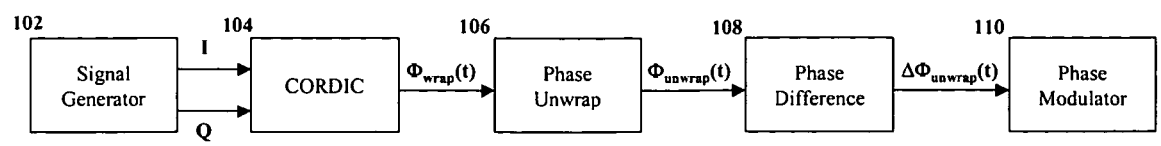
FIGS. 1(a)-(e) are diagrams illustrating phase modulation of an input signal

Embodiments of the invention include apparatus, methods and articles of manufacture for transmitting and receiving electromagnetic waves and signals. Embodiments of the invention may be entirely comprised of hardware, software and/or may be a combination of software and hardware. Accordingly, individual blocks and combinations of blocks in the drawings support combinations of means for performing the specified functions and/or combinations of steps for performing the specified functions. Each of the blocks of the drawings, and combinations of blocks of the drawings, may be embodied in many different ways, as is well known to those of skill in the art.

The word "signal" is used herein to describe an electromagnetic wave that has been modulated in some fashion, usually by the impression of intelligence upon the wave, for example imposing data upon a carrier wave. It should also be noted that the use of "signal" and "wave" in the singular includes the plural (or multiple signals and waves respectively) as often transmitters, receivers and transceivers generate more than one signal and/or wave in the normal course of their operation. For example, multiple harmonics of the baseband might be desirably generated as in amplitude modulation; multiple frequencies might be generated, etc. It should also be noted that embodiments of the invention might be used as well to input and/or output waves, as well as signals, as is further described below.

FIG. 1(a) illustrates the generation of a phase signal for inputting into a phase modulator. As shown in FIG. 1, in-phase (I) and quadrature (Q) components of an input signal from a signal generator 102 may be passed to a CORDIC processing application 104. CORDIC processor 104 may produce a wrapped phase signal, $\Phi_{wrap}(t)$, which may be inputted to a phase unwrapping processing application 106. Phase unwrapping processing application 106 may then convert this signal into an unwrapped phase signal, $\Phi_{unwrap}(t)$, through the use of a phase unwrap function. Unwrapping the phase signal in this fashion has the benefit that it eliminates the $2\pi$ modulo and gives a smooth unwrapped phase signal. This unwrapped phase signal meets the condition:

$|\Delta\Phi_{unwrap}(t)|=|\Phi_{unwrap}(t)-\Phi_{unwrap}(t-1)|<=\pi$

The unwrapped phase signal may thus be calculated from a wrapped phase signal by a phase unwrapping function:

$$\Phi_{unwrap}(t) = \Phi_{wrap}(t),$$
$$= \Phi_{wrap}(t) + \text{sign}(\Phi_{wrap}(t-1)) \times 2\pi,$$
if $|\Phi_{unwrap}(t) - \Phi_{unwrap}(t-1)| <= \pi$
otherwise.

The difference between the unwrapped phase sample and the previous unwrapped phase sample ($\Phi_{unwrap}(t)-\Phi_{unwrap}(t-1)$) may be calculated using a phase difference processing function 108. As those of ordinary skill in the art will appreciate, this processing function (and others discussed herein) may be implemented, for example, through logic circuitry or through one or more programs operating on one or more signal processors. The resulting phase difference, $\Delta\Phi_{unwrap}(t)$, may then be passed to phase modulator 110 for modulation.

However, the computed value for the unwrapped phase signal, $\Phi_{unwrap}(t)$, may be unbounded in some circumstances. For example, the unwrapped phase for a CDMA2000 phase signal may be as large as ±6000. In a fixed point implementation, a digital unwrapped phase signal would need at least 22 bits (s13.8) to have enough dynamic range for such a signal. This necessitates the use of a larger die size for the processing circuitry, which in turn consumes more power.

Figure 1B:
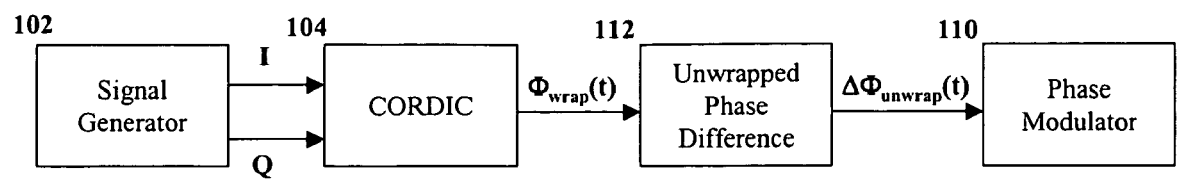

Alternatively, as shown in FIG. 1(b), the unwrapping function and the phase difference function may be combined into a single unwrapped phase difference function. In this embodiment, the wrapped phase signal, $\Phi_{wrap}(t)$, outputted from CORDIC processor 104 may be inputted into an unwrapped phase difference processing function 112. The output from unwrapped phase difference processor 112 is thus an unwrapped phase difference, $\Delta\Phi_{unwrap}(t)$. In this embodiment, the unwrapped phase difference function may be defined as:

$$\Delta\Phi_{wrap}(t) = \Phi_{wrap}(t) - \Phi_{wrap}(t-1).$$
$$\Delta\Phi_{unwrap}(t) = \Delta\Phi_{wrap}(t),$$
$$= \Delta\Phi_{wrap}(t) + \text{sign}(\Phi_{wrap}(t-1)) \times 2\pi,$$

where $\Phi_{wrap}(t) \in [-\pi, \pi]$ and $\Delta\Phi_{unwrap}(t) \in [-\pi, \pi]$.

if $|\Delta\Phi_{wrap}(t)| <= \pi$
otherwise,

In this embodiment, the unwrapped phase difference function 112 eliminates an intermediate step of separately computing the unwrapped phase. Consequently, both $\Phi_{wrap}(t)$ and $\Delta\Phi_{unwrap}(t)$ are in the range of $[-\pi,\pi]$ and the phase signal is bounded.

Figure 1C:
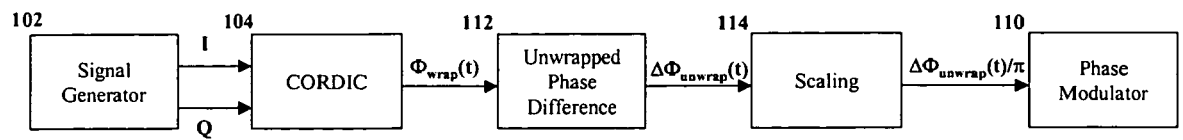

A further embodiment of the invention is illustrated in FIG. 1(c). In this embodiment, the phase difference signal may be scaled by $\pi$ to produce a bounded phase input signal. As shown in FIG. 1(c), the wrapped phase signal, $\Phi_{wrap}(t)$, from CORDIC processor 104 may be passed to unwrapped phase difference processor 112, producing unwrapped phase difference signal, $\Delta\Phi_{unwrap}(t)$. This signal may then be passed through a scaling function 114, where the magnitude of the unwrapped phase difference signal may be divided by $\pi$ to produce a phase signal in the range of $[-1, 1]$.

Figure 1D:
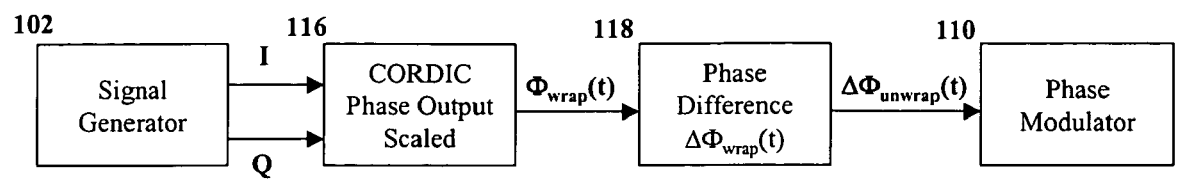

Alternatively, as illustrated in FIG. 1(d), this scaling application may be performed within a CORDIC processor, using scaled CORDIC processing application 116. As an example, this may be accomplished in a CORDIC processor without adding any additional computational steps by simply scaling the constant angle values of the I and Q components of the inputted phase signal.

Scaling the input phase signal by $\pi$ in the CORDIC processor produces a wrapped phase signal that is an n-bit 2's compliment number in the range of $[-1, 1]$. Because of this a simplified phase difference processing function 118 may be used. This phase difference function has the form:

$\Delta\Phi_{unwrap}(t)=\Phi_{wrap}(t)-\Phi_{wrap}(t-1)$, take n-bit LSB.

In this embodiment, no range check is required because the unwrapped phase difference function is just a simple 2's compliment subtraction. It is very efficient and does not require additional computations to determine the unwrapped phase difference.

Figure 1E:
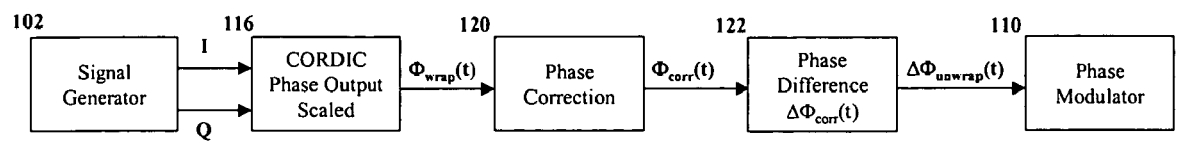

If phase correction of the input phase signal is needed, this may also be incorporated into the signal processing, as shown in FIG. 1(e). As shown in FIG. 1(e), a phase correction processing application 120 and a phase difference function 122 may be included. In this example, the scaled wrapped phase signal, $\Phi_{wrap}(t)$, outputted from CORDIC processor 116 may be inputted into phase correction function 120. The corrected scaled wrapped phase signal $\Phi_{CORR}(t)$, outputted from the phase correction function 120 may be inputted into phase difference function 122. Those of ordinary skill in the art will appreciate that the invention is not limited to this embodiment however. In this example, the scaled wrapped phase signal may then be corrected by using the function:

$\Phi_{corr}(t)=\Phi_{wrap}(t)+\Delta\Phi(t)$, take n-bit LSB, where $\Phi_{wrap}(t) \in [-1, 1]$ and $\Delta\Phi(t) \in [-1, 1]$.

In this example, the phase correction signal, $\Phi_{corr}(t)$, is a wrapped phase signal in the range of $[-1, 1]$ and the phase correction function may be a 2's compliment addition. Because of this, the phase correction function may serve as a modulo function as well.

Figure 2A:
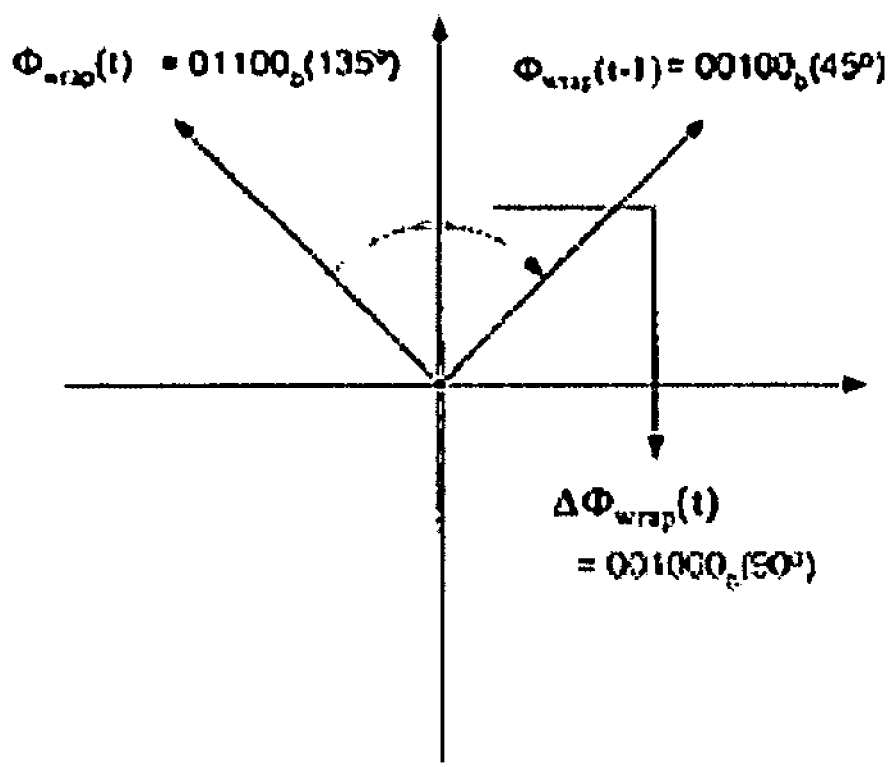
FIGS. 2(a)-(b) are charts illustrating phase modulation of an input signal.
Figure 2B:
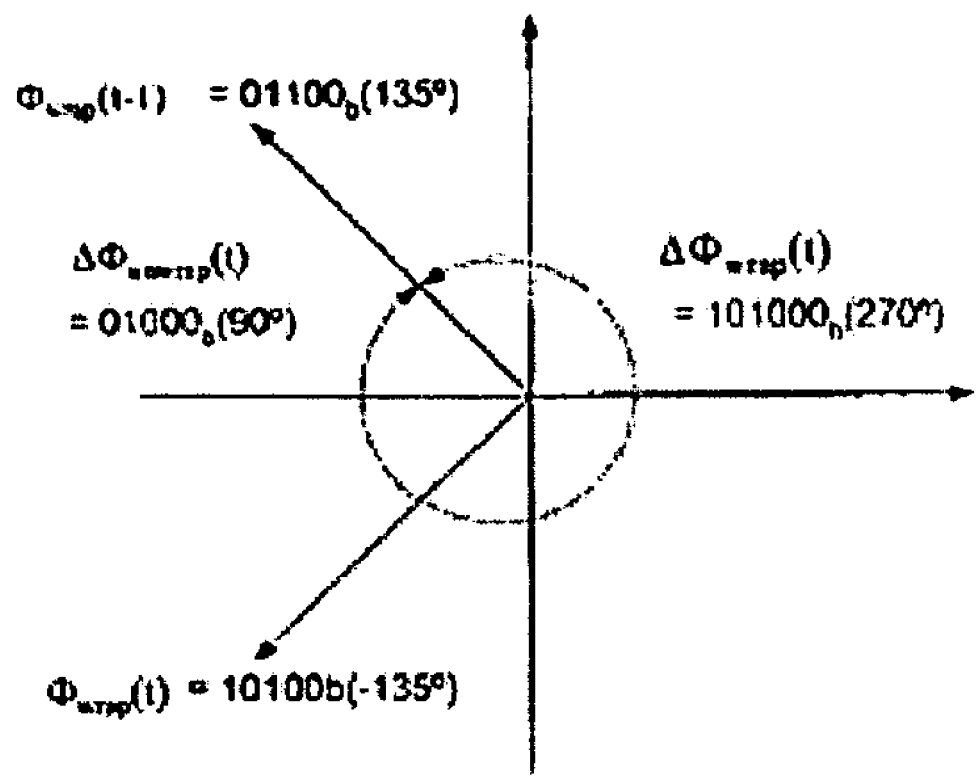

The benefits of the above-described fixed point implementation of a scaled and unwrapped phase difference function may be further understood by the example illustrated graphically in FIGS. 2(a)-(b). In this example, $\Phi_{wrap}$(t) is a 5-bit 2's compliment number between [−16, 15]. As illustrated below, using this implementation, the unwrapped phase difference may be computed using the same number of bits as the wrapped phase difference, regardless of whether the magnitude of the wrapped phase difference is greater or less than the input phase signal.

In case 1, shown in FIG. 2(a), $\Phi_{wrap}$(t) and $\Phi_{wrap}$(t−1) have the same sign bit. Because the magnitude of the wrapped phase difference is less than or equal to 16 ($|\Delta\Phi_{wrap}$(t)$|<=16$ (180° or $\pi$)), the unwrapped phase difference equals the wrapped phase difference ($\Delta\Phi_{unwrap}$(t)=$\Delta\Phi_{wrap}$(t)).

In case 2, shown in FIG. 2(b), $\Phi_{wrap}$(t) and $\Phi_{wrap}$(t−1) have a different sign bit. In this situation, the magnitude of the wrapped phase difference may be greater than 16 ($|\Delta\Phi_{wrap}$(t)$|>16$ (180° or $\pi$)). Consequently, the wrapped phase difference is overflowed because it is beyond the dynamic range of the processor. However, if five LSB bits of the wrapped phase difference signal, $\Delta\Phi_{wrap}$(t), are preserved when the overflow bit is thrown away, then the unwrapped phase difference will still be equal to the wrapped phase difference ($\Delta\Phi_{unwrap}$(t)=$\Delta\Phi_{wrap}$(t)).

Figure 3:
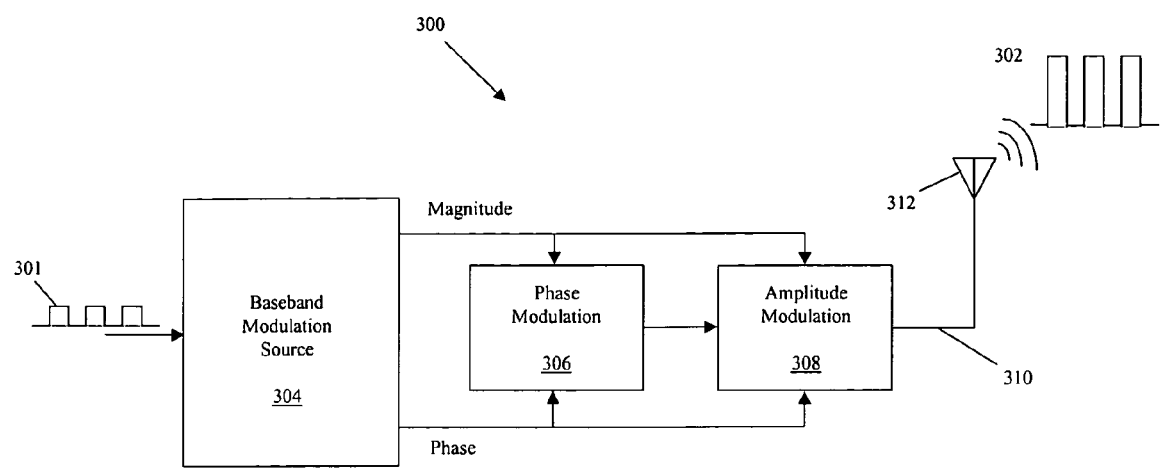
FIG. 3 is a diagram illustrating a transmitter incorporating phase and amplitude modulation.

One possible use of an phase wrapping system of the invention is in the transmission and reception of electromagnetic communication signals, although the invention is not limited thereto. FIG. 3 shows one embodiment of a general transmitter 300 for receiving an input wave 301 and transmitting an output signal 302. While described herein in terms of a transmitter, those of ordinary skill in the art will appreciate that the invention may also be used for receivers and transceivers as well.

Turning to FIG. 3, an input wave 301 may consist of varying types of intelligence, e.g., voice, data, etc. The input wave 301 may be analog or digital, and is not limited. Similarly the transmitted output signal 302 may consist of various types of intelligence modulated onto a carrier wave, e.g. voice, data, etc. While the output signal may be analog, a digital output signal may be constructed as well and the invention is not limited.

Transmitter 300 may comprise a baseband modulation source 304, phase modulation component 306, amplitude modulation component 308, load line 310, and an antenna 312. Baseband input wave 301 may be inputted into baseband modulation source 304, which may generate magnitude (R) and phase ($\theta$) data signals representative of input wave 301. The phase signal may be produced in the manner described above, which yields a bounded, unwrapped phase difference signal. These data signals may be used by phase modulation component 306 and amplitude modulation component 308 to generate output signal 302 at load line 310 in the manner described in more detail below. Output signal 302 may then be transmitted via antenna 312.

For example, the phase information ($\theta$) for input wave 301 may be inputted to phase modulator 306, where it may be modulated by a carrier wave signal to produce a phase modulated carrier signal. The phase modulated carrier signal may then be inputted to amplitude modulator 308. The gain or level of amplification of the amplitude of the modulated carrier wave signal may be controlled by the amplitude signal (R). This may be accomplished, for example, by using individual bits of a digital word representing the amplitude portion of input wave 301 to control individual power amplifiers or segments within amplitude modulator 308, each of which receives the modulated carrier wave signal.

In one embodiment, these R, $\theta$ characteristics of the original input wave may be modulated into digital pulses comprising a digital word quantitized into bits B1 to Bn, with a Most Significant Bit ("MSB") to Least Significant Bit ("LSB"). The digital word may be of varying lengths in various embodiments. In general, the longer the word the greater the accuracy of reproduction of the input wave by the system (i.e, its resolution). The digital words may or may not be converted to analog signals and are used to provide control for amplification of the modulated signal, in manner to be described further below. Of course, in other embodiments, a differently composed digital word may be used, or none at all; that is, characteristics of the input wave may remain in some analog form.

Figure 4A:
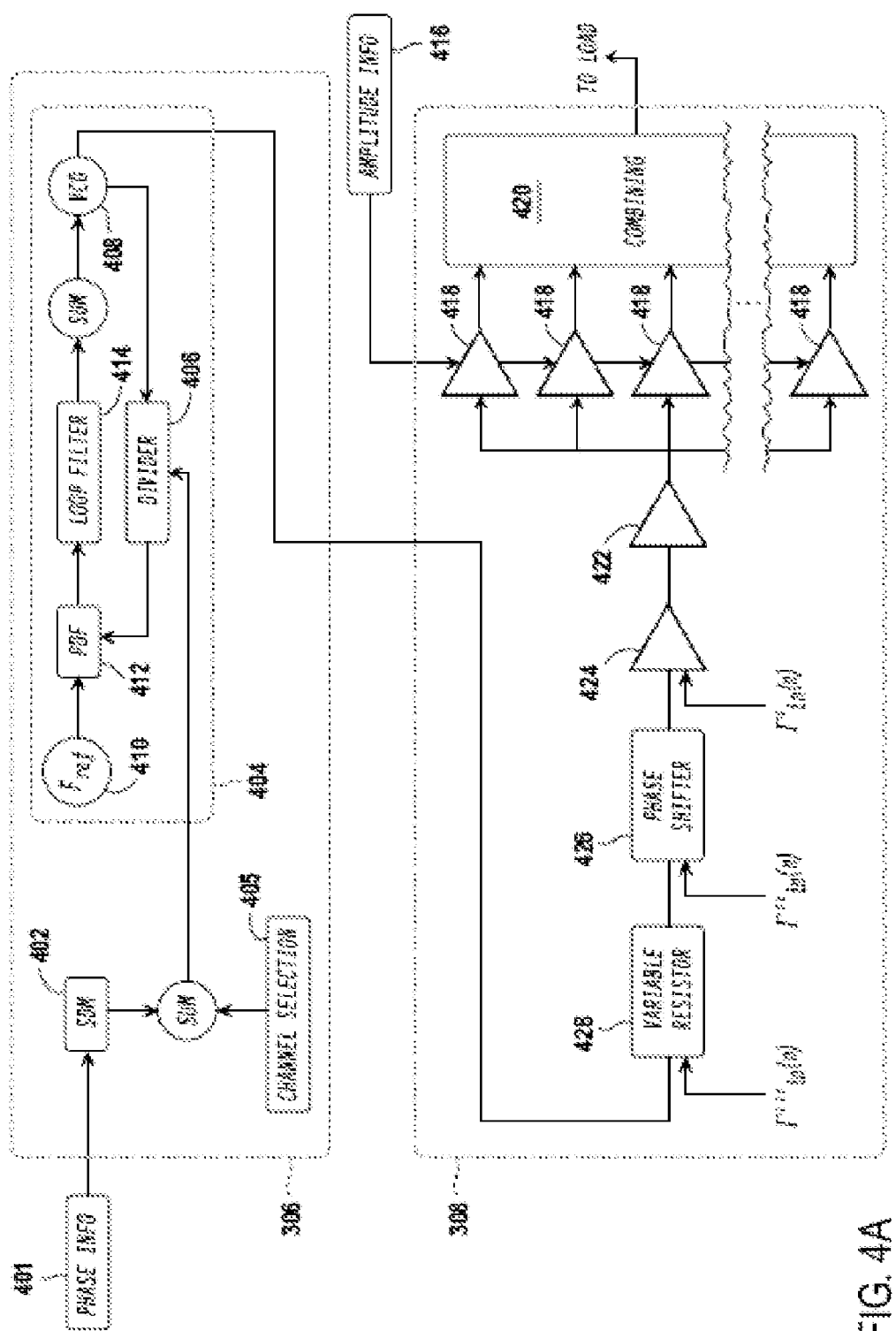
FIGS. 4(a)-(b) are diagrams illustrating a segmented amplification system in a phase and amplitude modulation transmitter.

A further illustration of an embodiment of such a transmitter that may incorporate an segmented amplifier is further illustrated in FIG. 4(a). As shown in FIG. 4(a), phase modulator 306 may comprise a sigma-delta modulation (SDM) based system, although the invention is not limited thereto.

The phase data signal 401 (the bounded phase difference signal produced in the manner described above) may be inputted into SDM 402. SDM 402 may be used in connection with phase-locked loop (PLL) 404 to achieve wideband modulation of the input signal onto a carrier wave.

The output of SDM 402 may then be combined with the integer portion of the channel number received from channel calculator 405. The combination of the fractional and integer portions of the channel number may be inputted to divider 406 in this embodiment and used to lock PLL 404 to the desired carrier wave signal. In one embodiment, the carrier wave signal is a radio frequency (RF) signal, although the invention is not limited thereto.

The PLL 404 in the illustrated embodiment may be used to modulate a wave signal synthesized by an RF carrier wave signal source, such as carrier wave source 408, using the phase portion of the input signal. Carrier wave source 408 may be any source of electromagnetic waves that is capable for producing a carrier wave, such as a radio frequency voltage-controlled oscillator (VCO).

The frequency of a reference source 410 (or a division thereof by some number) may be compared with the output frequency of carrier wave source 408, divided by the series of numbers received by divider 406 from SDM 402 and channel calculator 405. Reference source 410 is not limited and may comprise a VCO of a constant or substantially constant frequency or may be derived from a source at another frequency.

Phase-frequency detector (PFD) 412 may be used to compare the relative phases of the two signals and then output a signal that is proportional to the difference (phase shift) between them. This output signal may be utilized to adjust the frequency of carrier wave source 408, so that the phase difference measured at PFD 412 is substantially close and preferably equal to zero. Hence, the phase of the signal is locked by the feedback loop to prevent unwanted drift of the signal phase, due to variations in the phase and frequency of carrier wave source 408.

A feedback signal from carrier wave source 408 may be passed through divider 406, with the division ratio of the divider controlled by the series of numbers representing the phase component information received from SDM 402 and the channel information received from channel calculator 405. The resulting signal may be passed to PFD 412, where it is compared with the signal from reference source 410, as noted above. This combined signal may be passed through low-pass loop filter 414, and combined-with the carrier wave signal of carrier wave source 408.

The phase-modulated signal outputted from carrier wave source 408 may then be inputted into each of a plurality of individual amplifying segments (418) in amplitude modulator 308. The magnitude control signal 416 may also be inputted to control amplifying segments (418). These segments may comprise, for example, power amplifiers, although not limited thereto. Each of the power amplifying segments may or may not produce an output depending on the magnitude control signal received by it.

The output of each power-amplifying segment may then be combined in combining circuit 420, creating an output signal to drive the load. Combining circuit 420 is not particularly limited, and may comprise any mechanism for combining the output from each power amplifier, such as by using power transformers, quarter-wave transmission lines, discrete LC components (e.g., Pi-networks), and the like.

Figure 4B:
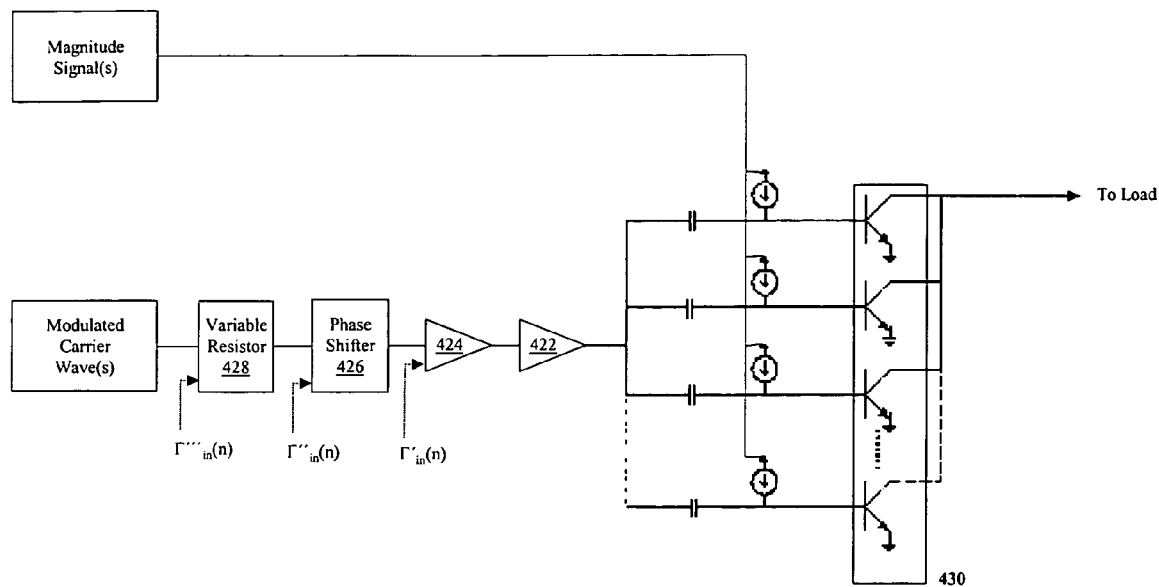

Alternatively, as shown in FIG. 4(b), the amplifier may also contain segmented transistor 430, which may serve as potential current sources. Each amplifying segment of the transistors may or may not act as a current source, because it is regulated via the appropriate control signal from the R data signal for regulating that control component, and activation of a segment is dependant upon the value of control signal, and concomitant regulation of the appropriate control component. The transistors and their segments may be an HBT transistor. Other transistors may be used as well, such as FET, etc., as well as other current or wave characteristic sources.

In one embodiment, each of the segments may vary in size. For example, if the overall gain of the amplifier is to be "A", one segment may be twice the size of the next segment, which in turn may be twice the size of the next segment, and so on until reaching the final segment, where the sum of the gain of all of the segments is equal to A. The largest segment may be controlled by the control signal for the R data signal that correlates to MSB of the original digital signal word, the signal representing the next bit to the next largest segment, etc., until the signal representing the LSB, which is sent to the smallest segment. Of course, as had been noted above, other embodiments may have a different pattern of matching signal to segment, and analog or digital signals may be used as the control signal. In other embodiments, other wave characteristics may be fed to another source of wave characteristics and so regulate that source.

Driver stages 422 and 424 may be used to control the current inputted into the SA. Phase shifter 426 and variable resistor 428 may be used to control the input impedance seen at the output of phase modulator 106 in the manner described above. This will allow the system of the invention to adaptively control the input impedance to the SA, thus correcting for any offset in the frequency of the modulated carrier wave due to the changes in state of the segments of the SA.

Of course, those of ordinary skill in the art will appreciate that while the invention has been described herein using a plurality of segments, a single segment maybe used as well. For example, the amplitude component the information signal may be used to control a single segment (or series of segments in an alternating fashion, where the alternating outputs of the segment are combined. Similarly, control signals may be filtered together to produce a control signal for a single amplifier segment or series of segments.

Thus, a portion of the signals that represent the input wave, such as the magnitude portion of the information signal, may be used to actuate individual amplifying segments within amplitude modulation component 108 to amplify the modulated carrier signal in relation to the original input wave. This produces an output current from amplitude modulation component 108 that represents an amplified carrier wave carrying the intelligence contained within the input wave.

In the especially preferred embodiments, a transmitter, receiver, and transceiver of the invention may be specialized for particular input waves, carrier waves and output signals, e.g. various types of cell phones, such as CDMA, CDMA2000, W-CDMA, GSM, TDMA, as well as various other types of devices, both wired and wireless, e.g. Bluetooth, 802.11a, -b, -g, GPS, radar, 1×RTT, radios, GPRS, computers and computer communication devices, handheld devices, etc. Among the modulation schemes supported by the invention are: GMSK, which is used in GSM; GFSK, which is used in DECT & Bluetooth; 8-PSK, which is used in EDGE, OQPSK & HPSK, which are used in IS-2000; p/4 DQPSK, which is used in TDMA; and OFDM, which is used in 802.11.

Various embodiments may utilize both analog and digital components insofar as these embodiments manipulate waves and signals requiring both. For example, cell phone embodiments may utilize both analog and digital components. Various types of system architectures may be utilized for constructing the embodiments. For example, an ASIC composition may be used in realizing the various architectures. CMOS and/or BiCMOS fabrication techniques may be used as well as a combination of both, e.g. a BiCMOS Phase modulator area combined with a CMOS baseband area. Generally, in the some embodiments, transistor speed is a concern, and BiCMOS provides faster speed. Additionally, BiCMOS provides less current drain than an all CMOS configuration.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. For example, various filtering components may be added as desired for filtering or processing signals propagating through the system. Various components may be combined or separated, or additional components may be added (such as isolating or gain controlling amplifiers). Accordingly, the foregoing description is by way of example only, and not limiting. The invention is limited only as defined in the following claims and equivalents thereto.

What is claimed is:

1. A method for the processing of an electromagnetic input signal comprising the steps of:

producing a wrapped phase signal that comprises a bounded phase signal that is an n-bit 2's compliment number in the range of [−1, 1] from said input signal; and producing an unwrapped phase difference signal by determining the difference between said wrapped phase signal and another wrapped phase signal produced from a previous sample and producing a wrapped phase difference signal;

wherein said unwrapped phase difference signal is said wrapped phase difference signal when said wrapped phase difference signal is less than or equal to $\pi$, and said unwrapped phase difference signal is said wrapped phase difference signal plus the sign of said another wrapped phase signal multiplied by $2\pi$ otherwise.

2. The method of claim 1, wherein said bounded phase signal is produced by using a CORDIC processor to produce a wrapped phase signal that is an n-bit 2's compliment number in the range of [−1, 1] as said bounded phase signal.

3. The method of claim 2, wherein said unwrapped phase difference signal is produced by taking a 2's compliment subtraction using said bounded phase signal.

4. The method of claim 1, further comprising the step of correcting said bounded phase signal to produce a corrected phase signal.

5. The method of claim 4, wherein said bounded phase signal is a wrapped phase signal that is an n-bit 2's compliment number in the range of [−1, 1] and said corrected phase signal is produced by taking a 2's complement addition using said bounded phase signal, wherein said phase difference signal is produced using said corrected phase signal.

6. A method for processing sample information for an input signal to generate a phase signal from an unwrapped phase difference signal for inputting into a phase modulator, said method comprising the steps of:
receiving said sample information;
scaling said sample information and producing a wrapped phase signal that is an n-bit 2's compliment number in the range of [−1, 1] for said sample; and
determining said unwrapped phase difference signal by:
determining the difference between said wrapped phase signal and another wrapped phase signal produced from a previous sample and producing a wrapped phase difference signal; and
wherein said unwrapped phase difference signal is said wrapped phase difference signal when said wrapped phase difference signal is less than or equal to $\pi$, and said unwrapped phase difference signal is said wrapped phase difference signal plus the sign of said another wrapped phase signal multiplied by $2\pi$ otherwise.

7. The method of claim 6, wherein said wrapped phase signal is produced by using a CORDIC processor.

8. The method of claim 7, wherein said unwrapped phase difference signal is produced by taking a 2's compliment subtraction using said wrapped phase signal.

9. The method of claim 6, further comprising the step of correcting said wrapped phase signal to produce a corrected phase signal.

10. The method of claim 9, wherein said wrapped phase signal is an n-bit 2's compliment number in the range of [−1, 1] and said corrected phase signal is produced by taking a 2's complement addition using said wrapped phase signal, and wherein said unwrapped phase difference signal is produced using said corrected phase signal.

11. The method of claim 6, wherein said sample information is in the form of one or more selected from the group consisting of in-phase and quadrature information and magnitude and phase information.

12. A method for processing sample information for an input signal to generate a phase signal from an unwrapped phase difference signal for inputting into a phase modulator, said method comprising the steps of:
receiving said sample information;
determining an n-bit 2's compliment number in the range of [−1, 1] from said sample information and producing a wrapped phase signal for said sample; and
determining said unwrapped phase difference signal by:
determining the difference between said wrapped phase signal and another wrapped phase signal produced from a previous sample by taking a 2's compliment subtraction using said wrapped phase signal and producing a wrapped phase difference signal;
wherein said unwrapped phase difference signal is said wrapped phase difference signal when said wrapped phase difference signal is less than or equal to $\pi$, and said unwrapped phase difference signal is said wrapped phase difference signal plus the sign of said another wrapped phase signal multiplied by $2\pi$ otherwise.

13. The method of claim 12, wherein said wrapped phase signal produced by using a CORDIC processor.

14. The method of claim 12, further comprising the step of correcting said wrapped phase signal to produce a corrected phase signal.

15. The method of claim 14, wherein said corrected phase signal is produced by taking a 2's complement addition using said wrapped phase signal, and wherein said unwrapped phase difference signal is produced using said corrected phase signal.

16. The method of claim 12, wherein said sample information is in the form of one or more selected from the group consisting of in-phase and quadrature information and magnitude and phase information.

17. An apparatus for processing an electromagnetic input signal comprising processing circuitry producing a bounded phase signal using an n-bit 2's compliment number in the range of [−1, 1] from said input signal and producing an unwrapped phase difference signal by determining the difference between said wrapped phase signal and another wrapped phase signal produced from a previous sample and producing a wrapped phase difference signal;
wherein said unwrapped phase difference signal is said wrapped phase difference signal when said wrapped phase difference signal is less than or equal to $\pi$, and said unwrapped phase difference signal is said wrapped phase difference signal plus the sign of said another wrapped phase signal multiplied by $2\pi$ otherwise.

18. The apparatus of claim 17, wherein said processing circuitry produces said unwrapped phase difference signal by taking a 2's compliment subtraction using said bounded phase signal.

19. The apparatus of claim 17, wherein said processing circuitry further comprises circuitry for correcting said bounded phase signal to produce a corrected phase signal.

20. The apparatus of claim 19, wherein said bounded phase signal is an n-bit 2's compliment number in the range of [−1, 1] and said processing circuitry produces said corrected phase signal by taking a 2's complement addition using said bounded phase signal, wherein said phase difference signal is produced using said corrected phase signal.

21. The apparatus of claim 17, wherein said processing circuitry includes one or more digital signal processors incorporating a CORDIC processor.

22. The apparatus of claim 21, wherein said digital signal processors is located on an ASIC chip.

23. A signal transmitter comprising:
baseband processing circuitry for processing an input signal to generate sample information containing amplitude and phase sample information for said input signal;
phase processing circuitry for receiving said phase sample information;
determining a wrapped phase signal for said phase sample information using an n-bit 2's compliment number in the range of [−1, 1]; determining an unwrapped phase difference signal by taking a 2's compliment subtraction using said wrapped phase signal and another wrapped phase signal from previous phase sample information and producing a wrapped phase difference signal; determining a phase signal from said unwrapped phase difference signal, wherein said unwrapped phase difference signal is said wrapped phase difference signal when said wrapped phase difference signal is less than or equal to $\pi$, and said unwrapped phase difference signal is said wrapped phase difference signal plus the sign of said another wrapped phase signal multiplied by $2\pi$ otherwise;

phase modulating circuitry for modulating a carrier wave using said phase signal to produce a phase modulated signal; and amplifying circuitry for regulating said phase modulated signal using said amplitude sample information to generate an output signal for transmission by said transmitter.

24. The transmitter of claim 23, wherein said phase processing circuitry produces a corrected phase signal by taking a 2's complement addition using said wrapped phase signal, wherein said unwrapped phase difference signal is produced using said corrected phase signal.

25. The transmitter of claim 23, wherein said phase processing circuitry includes one or more digital signal processors incorporating a CORDIC processor.

26. The transmitter of claim 25, wherein said digital signal processors is located on an ASIC chip.

27. The transmitter of claim 23, wherein said phase modulating circuitry includes a sigma delta modulator and a phase locked loop to modulated said carrier wave using said phase signal.

28. The transmitter of claim 23, wherein said amplifying circuitry comprises a plurality of segments.

29. The transmitter of claim 28, wherein one or more of said segments is independently controlled as a power amplifier by at least a portion of said amplitude sample information to contribute power to said output signal.

30. The transmitter of claim 29 further comprising a combining circuit for combining said power from said segment to generate said output signal, said combining circuit comprising one or more selected from the group consisting of power transformers, quaffer-wave transmission lines, discrete LC components, and a Pi-networks.

31. The transmitter of claim 28, wherein one or more of said segments is independently controlled as a current source by at least a portion of said amplitude sample information to contribute current to an output signal.

* * * * *